June 21, 1938. A. G. BELDEN 2,121,726
WORK SUPPORTING AND ROTATING MECHANISM
Filed Oct. 17, 1936
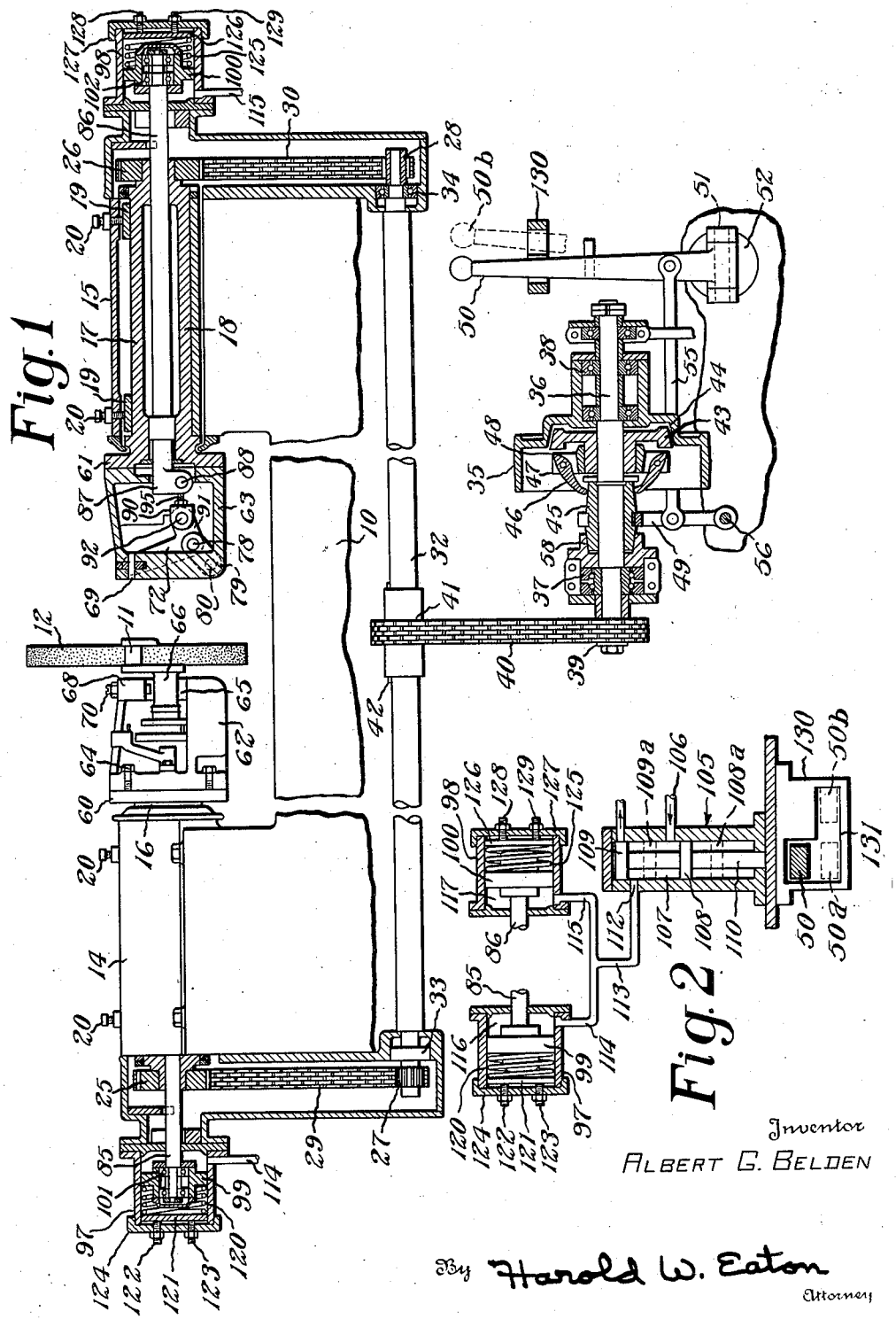
Inventor
ALBERT G. BELDEN
By Harold W. Eaton
Attorney Patented June 21, 1938

2,121,726

UNITED STATES PATENT OFFICE 2,121,726

WORK SUPPORTING AND ROTATING MECHANISM

Albert G. Belden, Worcester, Mass., assignor to Norton Company, Worcester, Mass., a corporation of Massachusetts Application October 17, 1936, Serial No. 106,153

3 Claims. (Cl. 51—237)

This invention relates to grinding machines, and more particularly to a crankshaft supporting and rotating mechanism for a double head crankshaft grinding machine.

One object of the invention is to provide a thoroughly practical crankshaft supporting and clamping mechanism. A further object of the invention is to provide an improved and simplified spring actuated crankshaft clamping mechanism. A further object of the invention is to provide a yieldable clamping mechanism positively to lock the crankpin in position on a rotary work holder. A further object of the invention is to provide a yieldable toggle actuated clamping mechanism in which the pressure is applied in a direction aligned with the axis of rotation of the work support. A further object of the invention is to provide a clamping mechanism in which a yieldable device is provided to clamp a work piece and an adjustment is provided whereby the tension of said yieldable device may be varied as desired. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawing, in which is shown one of various possible embodiments of the mechanical features of this invention, Fig. 1 is a fragmentary view, partly in section, of the improved crankshaft clamping, supporting and rotating mechanism; and Fig. 2 is a fragmentary sectional view, showing the piping and the control valve for controlling the release of the crankshaft clamping mechanism.

A double head crankshaft grinding machine has been illustrated in the drawing, comprising a work supporting table 10 which is adapted to slide on suitable ways on the machine base (not shown) and adapted rotatably to support a crankshaft 11 in operative relation with a rotatable grinding wheel 12 which may be mounted in any old and well known manner on a wheel slide (not shown). The wheel slide is provided with a suitable feed mechanism (not shown) so that the grinding wheel 12 may be fed toward and from the crankshaft 11 to grind the crankpins thereon to a predetermined size. The work table 10 is provided with a pair of work supporting heads 14 and 15 which, as illustrated, may be formed integral with the table 10 or, if preferred, may be bolted rigidly to the table and provided with a suitable adjustment so that the heads may be moved laterally of the table to align the axis of one head with the axis of the other.

The heads 14 and 15 are provided with rotatable work supporting spindles 16 and 17 journaled in the partial bearings 18 and provided with floating bearing members 19 which may be adjusted relative to the fixed portion of the bearings by adjusting screws 20. For further details of this bearing construction together with the drive for the spindles, reference may be had to the prior United States patent to C. H. Norton No. 1,563,310 dated November 24, 1925.

The work supporting spindles 16 and 17 are provided at their outer ends with sprockets 25 and 26, respectively, which are in turn connected with sprockets 27 and 28 by link chains 29 and 30, respectively. The sprockets 27 and 28 are mounted on a drive shaft 32 rotatably mounted in suitable bearings 33 and 34 depending from the work table 10. It will be seen from this construction that any rotation of the shaft 32 will be transmitted through the sprockets and chains synchronously to rotate the crankshaft supporting spindles 16 and 17. The shaft 32 may be driven by any suitable driving mechanism, such as a belt drive from an electric motor on the machine or from an overhead source of power. This drive comprises a pulley 35 rotatably mounted on a shaft 36 which is supported in suitable bearings 37 and 38 in the machine base. A sprocket 39 is mounted on the outer end of the shaft 36 and is connected by a link chain 40 with a sprocket 41 which is slidably keyed to the shaft 32. The sprocket 41 is provided with a key 42 so that the sprocket may be held against endwise movement as the table 10 and the shaft 32 are traversed or reciprocated longitudinally but at the same time arranged to permit rotation of the shaft 32 synchronously to rotate the crankshaft supporting spindles 16 and 17.

It is desirable in a machine of this type to provide a suitable control mechanism for starting and stopping the rotation of the work spindles. In the preferred construction, a clutch mechanism may be provided, such as a friction clutch of an old and well known type. This clutch may comprise a cone shaped member 43 which is slidably keyed to the shaft 36 and is adapted to engage a correspondingly shaped aperture 44 in the pulley 35. A cone shaped sleeve 45 is slidably keyed on the shaft 36 and is adapted to engage the ends of the long arms of a plurality of clutch fingers 46. The clutch fingers 46 are pivotally mounted on a supporting member 47 and arranged so that their short arms 48 engage one face of the cone shaped member 43. It will be readily apparent from this construction that when the sleeve 45 is moved toward the right (Fig. 1), the fingers 46 are swung about their pivot and operate to slide the cone shaped member 43 into engagement with the internal cone surface 44 to lock the pulley 35 to the shaft 36 and thereby start rotation of the crankshaft supporting spindles 16 and 17.

A yoked member 49 engages an annular groove in the sleeve 45 so as to control the engaging or disengaging of the clutch. In order that the clutch sleeve 45 may be readily controlled, a manually operable control lever 50 is pivotally mounted on a stud 51 so that the lever may be swung in a vertical plane toward and from the machine base. The stud 51 is supported on a pivot 52 so that the lever may be swung in a vertical plane substantially parallel to the ways of the machine. The lever 50 is connected by means of a link 55 to the yoked member 49 which is pivotally mounted on a stud 56 so that any movement of the lever 50 longitudinally of the machine is transmitted to engage or disengage the clutch. If the lever 50 is thrown toward the right into a position 50a, as illustrated in dotted lines in Fig. 1, then the clutch sleeve 45 is moved toward the right to engage the clutch member and lock the pulley 35 to the shaft 36, thereby transmitting power to the crankshaft supporting spindles 16 and 17. If the operator moves the lever 50 from position 50a into full line position 50, then the sleeve 45 is moved toward the left and into engagement with a cone shaped aperture 58 which is fixed on the machine base. The cone shaped sleeve 45 is slidably keyed to the shaft 36 so that when it comes into engagement with the cone shaped aperture 58, it will serve as a brake to stop the rotation of the crankshaft supporting and rotating spindles.

A clamping mechanism is provided which will rigidly lock the crankshaft 11 in place for a grinding operation. As illustrated, the inner ends of the spindles 16 and 17 are provided with enlarged face plates 60 and 61 to which the work supporting and clamping heads 62 and 63 are secured by means of bolts 64. Each of the heads 62 and 63 is provided with a fixed partial bearing member 65 adapted to support one of the main bearings 66 on the crankshaft 11. The surface of the bearing member 65 is arranged to support and align the crankshaft 11 for grinding. A lever 68 is pivotally mounted on a stud 69 on each of the work heads 62 and 63 and is provided at its outer end with a projecting stud 70 which is threaded within the end of the lever 68 to permit adjustment of the stud relative to the lever. It will be readily apparent from this construction that when the lever 68 is rocked about its pivot 69, the stud 70 is swung into engagement with the peripheral surface of the crankshaft 11 and the shaft is held rigidly in position on bearing members 65.

In the preferred construction, a toggle is provided to swing the lever 68 and to lock the crankshaft 11 in rigid engagement with the work supporting and rotating heads 62 and 63. This may comprise a bell crank lever 72 which is provided with an aperture 73 which is connected to one end of the lever 72 by a ball and socket joint, for example a construction such as that shown in the prior United States Letters Patent No. 1,837,342 to H. A. Silven et al. dated December 22, 1931. The lower end of the lever 72 is pivotally mounted on a stud 78 secured to a link 79 which is in turn pivoted on a stud 80 in the work heads 62 and 63. It will be readily apparent from the construction as illustrated in Fig. 1 that as the lever 72 is moved in the direction of the arrow, the pivot 80, being fixed, will tend to raise the ball and socket joint on the end of the lever 68 and swing the lever 68 about its pivot 69 to swing the clamping stud 70 into engagement with the crankshaft 11 to hold the shaft rigidly in position on the heads 62 and 63.

The toggle is preferably operated by a spring actuated mechanism to permit rotation of the work without disturbing the connections and adjustment or operation of the clamping mechanism. As illustrated, rods 85 and 86 are contained with an aperture within the spindles 16 and 17, respectively. The inner end of each rod 85 and 86 is provided with a projecting portion 87 supporting a stud 88 which in turn is connected by a yoked member 90 to a short arm 91 of the bell crank lever 72 by a stud 92. A screw threaded connection 95 is provided between the yoked member 90 and the stud 80 so that the operator may readily adjust the position of the stud 92 relative to the operating mechanism.

In order that the crankshaft may be readily unlocked after the grinding operation has been completed, a fluid pressure operated mechanism is provided so that the clamping members may be quickly unlocked to permit removal of the finished crankshaft and replacement thereof with a minimum amount of effort and loss of time. This mechanism comprises a pair of cylinders 97 and 98 which are preferably fixedly mounted on the outer ends of the heads 14 and 15 and positioned in axial alignment with the clamp actuating rods 85 and 86 and the spindles 16 and 17. The cylinders 97 and 98 contain slidably mounted pistons 99 and 100, respectively. The pistons 99 and 100 are connected by anti-friction bearings 101 and 102 with the outer ends of the clamp actuating rods 85 and 86, respectively. The cylinders 97 and 98 and the pistons 99 and 100 are of a relatively large cross sectional area so that sufficient pressure area is provided readily and quickly to actuate the toggle clamps to release a finish ground crankshaft from the machine.

A fluid pressure system is provided for conveying fluid under pressure to said cylinders. This system may comprise a control valve 105. Fluid under pressure may be admitted to the valve 105 from any suitable well known fluid pressure source, such as a fluid pump (not shown) within the base 10, through a pipe 106 which enters a valve chamber 107, between valve pistons 108 and 109 formed integral with a valve stem 110. This valve is preferably of a balanced piston type arranged so that fluid entering the valve chamber 107 equalizes the pressure on each of the pistons 108 and 109 and thereby permits a ready adjustment of the valve without undue exertion on the part of the operator. When the valve stem is moved outwardly so that the valve pistons 108 and 109 assume the dotted line positions 108a and 109a, respectively, the port 112 is open and fluid under pressure is passed through pipe 113 and pipes 114 and 115, into cylinder chambers 116 and 117, respectively, thereby moving the pistons 99 and 100 outwardly (Fig. 2) to operate the toggles and thereby unlock the work clamps to release a crankshaft after a grinding operation has been completed.

A yieldable spring actuated mechanism is provided to actuate the clamping members 68 so as to rigidly to lock a crankshaft 11 in position on the work heads 62 and 63. In the preferred form, a massive spring under compression is utilized to move the rods 85 and 86, respectively, toward each other to actuate the clamping members to lock the shaft in position. In the preferred construction, a massive compression spring 120 of relatively large diameter, preferably larger in diameter than the spindle 16, is provided within the cylinder 97 and is interposed between the piston 99 and an adjustable end thrust plate 121. The spring 120 may be of a size as illustrated substantially to fill the cylinder 97. If necessary, to obtain the desired compression, a spring of larger diameter may be readily provided by replacing the cylinder 97 with a cylinder and piston of larger cross-sectional area so that the size of the spring may be increased, if desired. Similarly, the length of the cylinder 97 may be of such a dimension as to accommodate a spring of the desired length to produce a compressional clamping pressure on the rod 85, as required, depending upon the crankshaft to be ground.

The compression of the spring 120 may be adjusted by means of a plurality of adjusting screws 122 and 123 which are screw threaded through a cylinder head 124 and are arranged to abut against the thrust plate 121. By adjusting the screws 122 and 123, the compression of the spring may be readily varied, as desired.

A similar spring pressure clamping mechanism is provided for actuating the rod 86 in the right-hand head (Fig. 1) to actuate the clamping jaw on the head 63. This mechanism comprises a spring 125 within the cylinder 98 which is interposed between the piston 100 and an adjusting thrust plate 126. A cylinder head 127 encloses the outer end of the cylinder 98. A plurality of adjusting screws 128 and 129 are screw threaded into the cylinder head 127 and abut against the thrust plate 126. By adjusting the screws 128 and 129, the compression of the spring 125 may be readily increased or decreased, as desired, to produce the desired clamping thrust on the rod 86 to actuate the clamping mechanism and secure the crankshaft 11 to be ground in engagement with the supporting head with the desired clamping pressure. It will be readily appreciated that the clamping springs 120 and 125 serve to produce a direct end axial movement of the clamping rods 85 and 86, and due to the fact that the spring is interposed between the piston and the end of the cylinder, serves to produce a clamping pressure by means of a massive non-rotatable spring which bears against the piston which transmits a clamping pressure through the piston, the anti-friction thrust bearing and the rods 85 and 86 to actuate the toggle clamp, as desired.

It is desirable that the work clamping mechanism and the clutch controlling the work rotation be so connected or interlocked that the rotation of the work head cannot be started until the crankshaft is rigidly held in an operating position in the work heads 62 and 63. Likewise, when grinding has been completed, the rotation of the work heads should be stopped before the clamping jaws 68 may be unlocked. To accomplish this, a lever controlling member 130 is provided for the lever 50. This member 130 is fixed to the base of the machine and is provided with a substantially L-shaped opening 131 which permits the control lever 50 to be swung in a plane parallel to the work supporting spindles and also in a plane at right angles to said spindles. The valve stem 110 is connected to the lever 50 by means of a block (not shown) which is fixed to the stem 110 and is slidably mounted in a T-shaped slot (not shown) in the control lever 50, thereby permitting a longitudinal swinging of the control lever as well as a movement axially of the valve stem 110. For a detailed disclosure of this construction, reference may be had to the above mentioned prior patent.

When the lever 50 is in the position illustrated in full lines in Figs. 1 and 2, the clutch 43 is disengaged, the spindles are stationary and the clamping mechanism unlocked. When the crankshaft 11 is inserted in position on the partial bearing members 65, the lever 50 is moved into position 50a, as shown in dotted lines in Fig. 2, to move the valve stem 120 and valve pistons 118 and 119 into a position shown in dotted lines as 108a and 109a. This movement closes the port 112 and prevents further admission of fluid into the cylinder chambers. When the piston 109 passes by and cuts off the port 112, the released tension of the spring 120 and 125 operating against the fluid in the cylinders forces the fluid from the cylinder chambers 116 and 117 and exhausts it through the pipes 114 and 115, through pipe 113, a chamber within the valve 105 and out through a pipe 140, into the reservoir (not shown). As the compression of the springs 120 and 125 is released by the exhaust of fluid, the rods 85 and 86 are moved inwardly to operate the toggles and thereby swing the clamping jaws 68 so that the studs 70 lock the crankshaft 11 securely in position. The operator may then swing the control lever 50 from position 50a toward the right into position 50b (Figs. 1 and 2). This movement of the control lever 50 slides the clutch sleeve 45 toward the right to throw the clutch member 43 into engagement with the clutch member 44 and thereby lock the pulley 35 to the shaft 36 and start synchronous rotation of the spindles 16 and 17.

Similarly, after the grinding operation is completed, the operator moves the control lever 50 from the position 50b (Fig. 2) into position 50a, thereby moving the sleeve 45 toward the left to disengage the clutch members 43 and 44 and to throw the sleeve 45 into engagement with an aperture wall 58 to brake and stop the rotation of the spindles 16 and 17. After the rotation of the spindles has been stopped, the operator may swing the control lever 50 from the position 50a (Fig. 2) into position 50, as shown in full lines, to move the valve stem and valve pistons from the dotted positions 108a and 109a into the positions as shown in full lines 108 and 109. This permits fluid under pressure to pass through pipe 106, into valve chamber 107, and through port 112, pipe 113 and pipes 114 and 115 into cylinder chambers 116 and 117, respectively. The fluid under pressure in the cylinder chambers 116 and 117 moves the pistons 99 and 100 away from each other, which operates to move the rods 85 and 86 away from each other against the compression of the springs 120 and 125 to operate the toggles and unlock the crankshaft after a grinding operation has been completed.

The operation of this mechanism will be readily apparent from the foregoing disclosure. A crankshaft 11 to be ground is placed in position on the work supporting bearings 65 on the work heads 62 and 63. The lever 50 is then moved from the full line position (Fig. 1) into position 50a which, as previously described, operates to permit fluid to exhaust through pipes 114 and 115 from the cylinder chambers 116 and 117 and thereby release the compression of the spring 120 and 125 to cause an axial movement of the rods 85 and 86, respectively, which in turn operates to clamp the crankshaft 11 rigidly in an operating position on the work supporting and rotating heads 62 and 63. The lever 50 may then be moved from position 50a into position 50b, as shown in Figs. 1 and 2, which starts rotation of the work. The grinding wheel 12 may then be fed toward the crankpin to be ground to grind and reduce the same to the desired predetermined size. After the pin has been finish ground, the grinding wheel 12 is then moved from operative engagement with the crankpin and the work rotation is stopped by moving the lever 50 from position 50b into position 50a to disengage the clutch to stop the rotation of the work heads 62 and 63, and then into full line position to unclamp the crankshaft 11 after the grinding operation has been completed.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:—

1. In a grinding machine, a work head, a hollow rotatable spindle supported therein, a work supporting member mounted on said spindle, a clamping jaw arranged to engage the work piece, a toggle arranged to operate said jaw, a slidable rod within said spindle, connections between the rod and toggle to actuate the latter, a cylinder mounted on the end of said head in axial alignment with said spindle and rod, a piston slidably mounted within said cylinder, an anti-friction bearing within said piston and connecting said piston with said rod, means to admit fluid under pressure to one side of said cylinder to move the rod so as to open said toggle and release said jaw, a compression spring within said cylinder and interposed between the other side of said cylinder and a cylinder head, a thrust plate between the cylinder head and the end of said spring, and means to adjust the position of said plate to increase or decrease the compression of said spring.

2. In a grinding machine, a pair of opposed aligned work heads, a rotatable spindle supported in each of said heads, a work supporting member carried on the inner end of each of said spindles, a clamping jaw on each of said heads, a slidably mounted rod within each of said spindles which is operatively connected to actuate said clamping jaw, a cylinder of greater diameter than that of the spindle which is mounted on the end of each head, a piston within each cylinder connected to the outer ends of said rods, a large diameter compression spring within each of said cylinders and interposed between said pistons and the ends of said cylinder to actuate said rod and clamping jaws to clamp a work piece in said head, and means to adjust said springs to vary the clamping pressure.

3. In a grinding machine, a pair of opposed aligned work heads, a rotatable spindle supported in each of said heads, a work supporting member carried on the inner end of each of said spindles, a clamping jaw on each of said heads, a slidably mounted rod within each of said spindles which is operatively connected to actuate said clamping jaw, a cylinder of greater diameter than that of the spindle which is mounted on the end of each head, a piston within each cylinder connected to the outer ends of said rods, a large diameter compression spring within each of said cylinders and interposed between said pistons and the ends of said cylinder to actuate said rod and clamping jaws to clamp a work piece in said head, a thrust plate between the ends of said springs and cylinders, and means to adjust the position of said plates to adjust the compression of said springs.

ALBERT G. BELDEN.